US006420715B1

(12) United States Patent
Cormack et al.

(10) Patent No.: US 6,420,715 B1
(45) Date of Patent: Jul. 16, 2002

(54) METHOD AND APPARATUS FOR IMPROVED MIXING IN FLUIDS

(75) Inventors: Donald Cormack, Scarborough; Keith Bircher, Toronto, both of (CA)

(73) Assignee: Trojan Technologies, Inc., London (CA)

( * ) Notice: Subject to any disclaimer, the term of this patent is extended or adjusted under 35 U.S.C. 154(b) by 0 days.

(21) Appl. No.: 09/434,224

(22) Filed: Nov. 5, 1999

Related U.S. Application Data

(62) Division of application No. 08/933,573, filed on Sep. 19, 1997, now Pat. No. 6,015,229.

(51) Int. Cl.[7] .............................. B01J 19/12; B01F 5/06
(52) U.S. Cl. ....................... 250/438; 250/437; 250/436; 366/336; 366/337
(58) Field of Search ................................. 366/337, 338, 366/339, 340, 336; 250/432, 435, 436, 437, 438; 422/24, 186.3; 210/198.1, 232

(56) References Cited

U.S. PATENT DOCUMENTS 3,337,194 A * 8/1967 Zavasnik et al. ........... 366/337
4,482,809 A    11/1984 Maarschalkerweerd (List continued on next page.)

FOREIGN PATENT DOCUMENTS

| EP | 0268968 | 6/1988 |
| EP | 0802163 | 10/1997 |
| WO | WO 9402680 | 2/1994 |

OTHER PUBLICATIONS

Bertin, John J. and Smith, Michael L. "Aerodynamics for Engineers" 2nd Edition, Englewood Cliffs–Prentice Hall, NJ, 1989.

(List continued on next page.)

*Primary Examiner*—Tony G. Soohoo
(74) *Attorney, Agent, or Firm*—Katten Muchin Zavis Rosenman (57) ABSTRACT

The present invention provides an apparatus and method for accomplishing fluid disinfection by passing fluid flow through a uniform array of ultraviolet lamps having cross sections perpendicular to the direction of fluid flow that define channels for the fluid flow. Positioned next to the end of each lamp at the entrance of the fluid flow are triangular shaped delta wings having surfaces inclined at an angle to the direction of fluid flow. The interaction of the fluid flow with each delta wing creates a pair of vortices that rotate in the same direction or in directions opposed to each other. The counter-rotating vortices reinforce each other to minimize dissipation of their mixing strength as they move down the channel. Due to these co-reinforcing properties these counter-rotating vortices more promote efficient mixing of the fluid which is required to achieve more efficient use of the light in the UV disinfection systems, along with heat and/or mass transfer in chemical reactions. Although the present invention is described in particularity as embodied in a UV reactor system, it will be understood by those skilled in the art that the present invention has equal applicability to other types of arrayed flow systems in which increased fluid mixing is desired.

72 Claims, 13 Drawing Sheets

U.S. PATENT DOCUMENTS

| | | | |
|---|---|---|---|
| 4,498,786 A | * 2/1985 | Ruscheweyh | 366/336 |
| 4,872,980 A | 10/1989 | Maarschalkerweerd | |
| 4,929,088 A | * 5/1990 | Smith | 366/336 |
| 5,006,244 A | 4/1991 | Maarschalkerweerd | |
| 5,019,256 A | * 5/1991 | Ifill et al. | 250/436 |
| 5,330,267 A | * 7/1994 | Tauscher | 366/337 |
| 5,332,388 A | 7/1994 | Schuerch et al. | |
| 5,418,370 A | 5/1995 | Maarschalkerweerd | |
| 5,423,608 A | * 6/1995 | Chyou et al. | 366/337 |
| 5,456,533 A | * 10/1995 | Streiff et al. | 366/337 |
| 5,471,063 A | 11/1995 | Hayes et al. | |
| 5,489,153 A | * 2/1996 | Berner et al. | 366/337 |
| 5,504,335 A | 4/1996 | Maarschalkerweerd | |
| 5,514,871 A | 5/1996 | Hayes et al. | |
| 5,539,209 A | 7/1996 | Maarschalkerweerd | |
| 5,540,848 A | 7/1996 | Engelhard | 210/748 |
| 5,590,390 A | 12/1996 | Maarschalkerweerd | |
| 5,614,723 A | * 3/1997 | Oppenlander et al. | 250/437 |
| 5,624,573 A | * 4/1997 | Wiesmann | 250/436 |
| 5,683,589 A | * 11/1997 | de Lasa et al. | 210/748 |
| 5,696,380 A | * 12/1997 | Cooke et al. | 250/438 |
| 5,800,059 A | * 9/1998 | Cooke et al. | 366/337 |
| 5,846,437 A | * 12/1998 | Whitby et al. | 210/748 |
| 5,866,910 A | * 2/1999 | Cooke et al. | 250/438 |
| 5,994,705 A | * 11/1999 | Cooke et al. | 210/438 |
| 6,000,841 A | * 12/1999 | Cooke et al. | 366/337 |

OTHER PUBLICATIONS

Bradshaw, P. "Turbulence" Springer–Verlag, Berlin, NY, 1976.

DeLuca, L., Guglieri, C.G., and Carlomagno, G.M. "Experimental Analysis of Surface Flow on a Delta Wing by Infrared Thermography" A.I.A.A. Journal vol. 33, No. 8, Aug. 1995. pp. 1510–1512.

Gibson, A.H. "Hydraulics and Its Applications" 4th Edition, D. Van Nostrand, NY, 1930.

Helin, H.E. and Watry, C.W. "Effects of Trailing–Edge Jet Entrainment on Delta Wing Vortices" A.I.A.A. Journal. vol. 32, No. 4, Apr. 1994, pp. 802–804.

Hemsch, M.J. and Luckring, J.M. "Connection between Leading Edge Sweep, Vortex Lift and Vortex Strength for Delta Wing" Journal of Aircraft. vol. 27, No. 5, 1990, pp. 473–475.

Hubner, J.D. and Komerath, N.M. "Counter–Rotating Structures Over a Delta Wing" A.I.A.A. Journal vol. 34, No. 9, Sep. 1996, pp. 1958–1960.

Kline, S.J., "On the Nature of Stall" Journal of Basic Engineering or The Translations of the American Society of Mechanical Engineers, Series D, vol. 81, 1959.

Kline, S.J., Abbott, D.E., and Fox, R.W. "Optimum Design of Straight–Walled Diffusers" Journal of Basic Engineering of The Transactions of the American Society of Mechanical Engineers, Series D, vol. 81, 1959.

Kline, S.J. and Cochran D.L., The Use of Short Flat Vanes for Producing Efficient Wide–Angle Two–Dimensional Subsonic Diffusers N.A.C.A. Technical Note 4309, Apr. 1957.

Kline, S.J. and Moore, Carl.A., "Some Effects of Vanes and of Turbulence on Two–Dimensional Wide–Angle Subsonic Diffusers" N.A.C.A. Technical Note 4080, Sep. 1955.

McCormick, Barnes Warnock "Aerodynamics, Aeronautics and Flight Mechanics" 2nd Edition, Wiley, NY, 1985.

Mehta, R.D. and Bradshaw, P. Longitudinal Vortices Imbedded in Turbulent Boundary Layers Part 2: Vortex Pair with "Common Flow" Journal of Fluid Mechanics. vol. 188, pp. 529–546, 1988.

Mohamed, Gad–el–Hak and Blackwelder, Ron. "The Discrete Vortices from a Delta Wing" A.I.A.A. Journal vol. 23, No. 6, Jun. 1985, pp. 961–962.

Parkinson, Lesile Randall "Aerodynamics" The McMillan Co., NY, 1944.

Payne.F.M., Ng. T.T., and Nelson R.C. "Visualization and Wake Surveys of Vortical Flow over a Delta Wing" A.I.A.A. Journal. vol. 26, No. 2, Feb. 1988, pp. 137–143.

Rediniotis, O.K., Klute, S.M., Hoang, N.T. and Telionist, D.P. "Dynamic Pitch–Up of a Delta Wing" A.I.A.A. Journal vol. 32, No. 4, Apr. 1994, pp. 716–725.

Rediniotis, O.K., Stapountzis, H. and Telionist D.P. "Vortex Shedding over Delta Wings" A.I.A.A. Journal vol. 28, No. 5, May 1990, pp. 944–946.

Rizzi, A. and Muller, B. "Large Scale Viscous Simulation of Laminar Vortex Flow Over a Delta Wing" A.I.A.A. Journal vol. 27, No. 7, Jul. 1989, pp. 833–840.

Robertson, James M. & Fraser, Harvey R. "Separation Prediction for Conical Diffusers" Journal of Basic Engineering or The Transactions of the American Society of Mechanical Eng. Series D., vol. 82, No. 1, 1960.

Rom, Josef. "High Angle of Attack Aerodynamics: Subsonic. Transonic and Supersonic Flows" Springer–Verlag, NY, 1992.

Stahl, W.H., Mahnood, M. and Asghar, A. "Experimental Investigations of the Vortex Flow on Delta Wings at High Incidence" A.I.A.A. Journal. vol. 30, No. 4, Apr. 1992, pp. 1027–1032.

Streeter, Victor L. "Fluid Mechanics" 8th Edition, McGraw–Hill, NY, 1985.

Tults, Harold "Flow Expansion and Pressure Recovery in Fluids" Proceedings of the American Society of Civil Engineers, vol. 80, No. 567, 1954.

Visser, K.D. and Nelson, R.C. "Measurements of Circulation and Vorticity in the Leading Edge Vortex of a Delta Wing" A.I.A.A. Journal vol. 31, No. 1, Jan. 1993, pp. 104–111.

Wood, Karl Dawson Technical Aerodynamics 2nd Edition, McGraw–Hill, NY, 1947.

Young, Donald F. "A Brief Introduction to Fluid Mechanics" John Wiley & Sons, NY, 1997.

Carletti, Mark J., et al., "Parametric Study of Jet Mixing Enhancement by Vortex Generators, Tabs and Deflector Plates" 1996 Fluids Engineering Div. Conference, vol. 2, A.S.M.E. 1996, FED–vol. 237, pp. 303–312.

Katz, Joseph and Plotkin, Allen "Low–Speed Aerodynamics" McGraw–Hill New York, 1991.

* cited by examiner

The Role of Aspect Ratio and Angle of Attack
on the Stability of the Vortex Flow Field (Ref. #9)

FIG. 8A

Designed Wing Geometry

METHOD AND APPARATUS FOR IMPROVED MIXING IN FLUIDS

CROSS-REFERENCE

This application is a division of U.S. patent application Ser. No. 08/933,573 filed Sep. 19, 1997, the disclosure of which is incorporated herein by reference.

FIELD OF THE INVENTION

The present invention provides a method and apparatus for improved mixing in fluids, and in particular provides a method and apparatus for improved mixing in systems that use ultraviolet (UV) radiation for disinfection of fluids.

BACKGROUND OF THE INVENTION

The use of ultraviolet (UV) radiation to kill microorganisms in air or fluid systems is well known. However, traditional UV disinfection systems are not very efficient in energy utilization. Up to twice as much power is used than is theoretically necessary because the UV light is absorbed by the fluid after penetrating only a short distance (less than 1 inch in water, for example), with the result that fluid that does not come close to the lamp is not treated. This invention proposes a method for creating large scale sustained mixing down the length of the UV lamp to bring substantially the entire volume of fluid close to the lamp for uniform treatment.

Traditional arrayed low pressure/low lamp power UV disinfection systems have relatively long fluid residence times within the mixing apparatus and UV lamps of a length in the direction of fluid flow that permit sufficient mixing to be achieved to result in a low energy utilization efficiency. With the introduction of medium pressure/high power lamp systems, both the fluid residence time and the length of the lamps are decreased while the spacing perpendicular to fluid flow between adjacent arrayed lamps is increased with the result that the energy utilization efficiency is reduced even further. It has been shown that mixing baffles can improve the energy utilization efficiency. However the mixing eddies created by the baffles are short lived and require high energy input (pressure drop). Waste water disinfection systems are usually gravity fed systems that do not have large amounts of head (pressure) that can be used for mixing. The need to efficiently convert flow energy into vortices which effectively mix the fluid being treated arises because in most sewage treatment plants there is little flow energy (i.e. pressure drop) to spare. Plants are built with specific pressure drop requirements in mind. In a retrofit application, one may have a pressure drop of less than six inches of water to accomplish the required mixing.

To eliminate the undesirable tradeoff between energy efficiency and energy input, the present invention proposes a set of vortices essentially axially aligned in the direction of fluid flow that sustain themselves over the length that the fluid flow is exposed to the UV lamps, with the result that the production of short-lived small scale eddies which are a waste of input energy is minimized. These vortices can be produced by several means including the use of moving or stationary structures placed in the flow path such as specially shaped baffles, propellers and contoured flow tubes, among others.

The preferred embodiment of the present invention proposes the use of matched pairs of delta-shaped wings at the inlet end of an arrayed reactor to produce the counter-rotating vortices. Through use of delta wings to create co-rotating or counter-rotating vortices, the present invention permits efficient mixing with low pressure drop to allow for more efficient use of the UV light in stimulating heat and/or mass transfer in the chemical reactions causing fluid disinfection to consequently reduce the capital and operating costs of UV disinfection systems.

Accordingly, it is an object of the present invention to provide a method and apparatus to achieve increased mixing within arrayed or non-arrayed fluid flow systems so as to increase the energy utilization efficiency in such systems without degrading system energy input requirements.

It is a further object of the present invention to provide a method and apparatus to achieve increased mixing in arrayed or non-arrayed fluid flow systems by creating a set of co-rotating or counter-rotating vortices that sustain themselves throughout the entire duration of fluid travel through such systems.

It is a further object of the present invention to use delta-shaped wings at the inlet end of an arrayed or non-arrayed fluid flow system to produce co-rotating or counter-rotating vortices for the purpose of achieving increased mixing in such systems.

Accordingly, it is an object of the present invention to provide a method and apparatus to achieve increased mixing within ultraviolet (UV) fluid disinfection systems to increase the energy utilization efficiency in such systems without degrading system energy input requirements.

It is a further object of the present invention to provide a method and apparatus to create a set of co-rotating or counter-rotating vortices in UV fluid disinfection systems that sustain themselves substantially throughout the entire duration of fluid exposure to UV radiation.

It is a further object of the present invention to use delta-shaped wings at the inlet end of a UV fluid disinfection system to produce co-rotating or counter-rotating vortices for the purpose of achieving increased mixing in such systems.

Although the present invention is described in particularity as embodied in a UV disinfection system, it will be understood by those skilled in the art that the present invention has equal applicability to other types of arrayed or non-arrayed flow systems in which increased fluid mixing is desired.

SUMMARY OF THE INVENTION

The preferred embodiment of the present invention provides an apparatus and method for accomplishing fluid mixing by passing fluid flow through an array of ultraviolet lamps lying essentially along the direction of fluid flow that define channels for the fluid flow. Positioned upstream or adjacent to each tube are triangular shaped delta wings having surfaces inclined at an angle to the direction of fluid flow. The interaction of the fluid flow with each delta wing creates a pair of vortices that counter-rotate in opposite directions to each other. These counter-rotating vortices reinforce each other to minimize dissipation of their mixing strength as they move down the channel. Due to these co-reinforcing properties, the counter-rotating vortices promote more efficient mixing of the fluid to achieve more efficient use of the light in the UV disinfection system.

Although the present invention is described in particularity as embodied in a UV disinfection system, it will be understood by those skilled in the art that the present invention has equal applicability to other types of arrayed or non-arrayed flow systems in which increased fluid mixing is desired, and that self-sustaining co-rotating or counter-rotating vortices axially aligned in the direction of fluid flow can be produced by several means other than delta wings, including the use of moving or stationary structures placed in the flow path such as specially shaped baffles, propellers and contoured flow tubes, among others.

Other details, objects, and advantages of the present invention will become apparent in the following description of the presently preferred embodiments.

DETAILED DESCRIPTION OF THE PRESENTLY PREFERRED EMBODIMENTS

Figure 1:
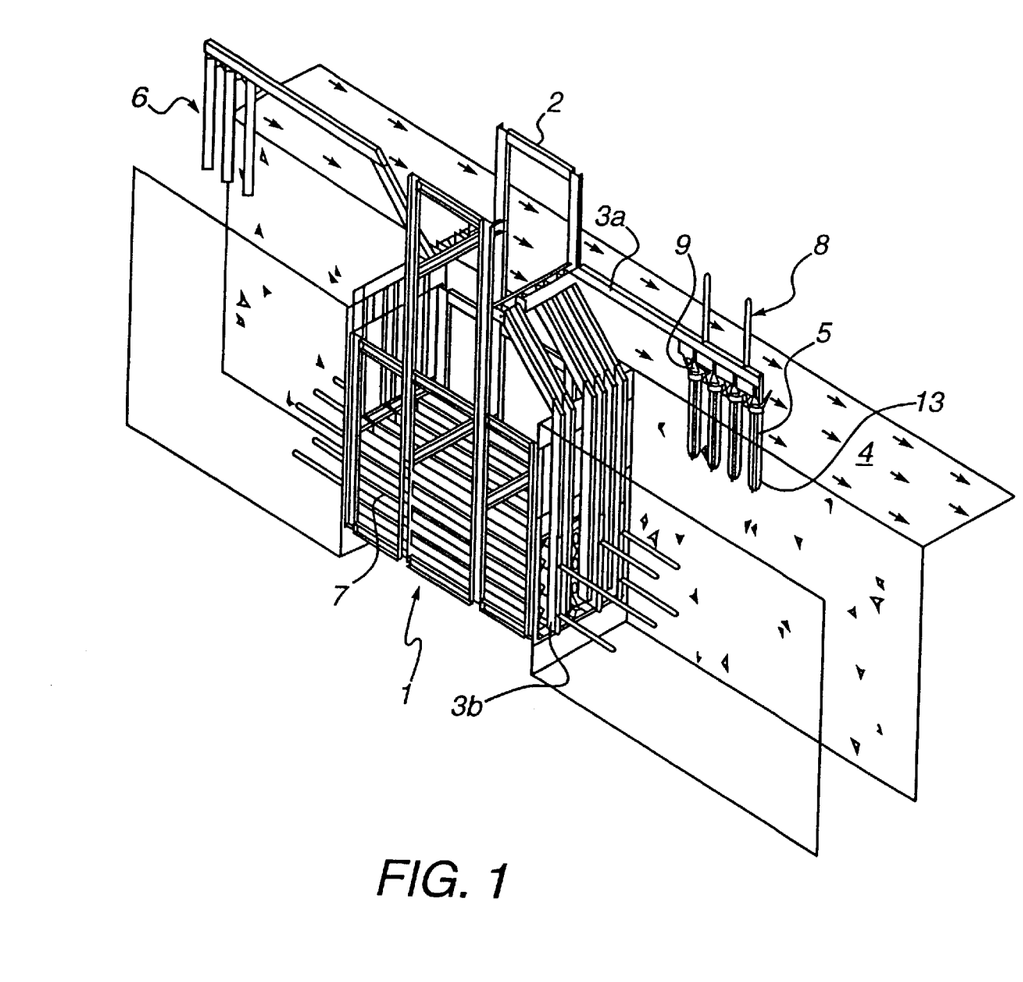
FIG. 1 is a perspective view of the ultraviolet disinfection apparatus of the preferred embodiment of the present invention.

FIG. 1 shows an arrayed fluid mixing apparatus 1, which in the preferred embodiment is utilized in an ultraviolet (UV) radiation disinfecting system. The fluid mixing apparatus consists of a frame 2 to which articulating arms 3 are attached. Each articulating arm contains a row of electrically powered lamps 5 which are each surrounded by a tube 13 made of a material that transmits ultraviolet (UV) radiation such as quartz. The arms 3 are movable between a first position 3a from which the lamps may be removed and/or replaced and a second position 3b in which the lamps 2 are arranged in array form 3b to allow a fluid 4 such as water to flow in a direction essentially parallel to the longitudinal axis of the tubes 13. When in the arrayed position 3b the lamps 5 expose the fluid 4 to UV radiation for a period sufficient to accomplish disinfection. Some of the arms 3 of the UV disinfection apparatus 1 are configured to carry spacer modules 6 instead of lamp tubes 13. By filling the void spaces in the area furthest from the tubes 13 the spacer modules 6 preserve the vortex flow profile and prevent fluid from bypassing exposure to UV light. The use of spacer modules 6 allows greater spacing between lamps and hence a larger cross-sectional area for the fluid flow, resulting in lower fluid velocity and associated pressure drop. The lower velocity also makes it unnecessary to provide an inlet transition region to prevent inlet pressure losses. The apparatus shown in FIG. 1 is arranged in banks of four lamp tube modules 13 and three spacer modules 6. Fluid flow 4 occurs in the channels 7 between adjacent tubes 13 and/or spacer modules 6. Degradation of UV exposure is prevented by air cylinders 8 that move a cleaning mechanism to remove foreign materials deposited by the fluid 4 on the tubes 13.

Figure 2A:
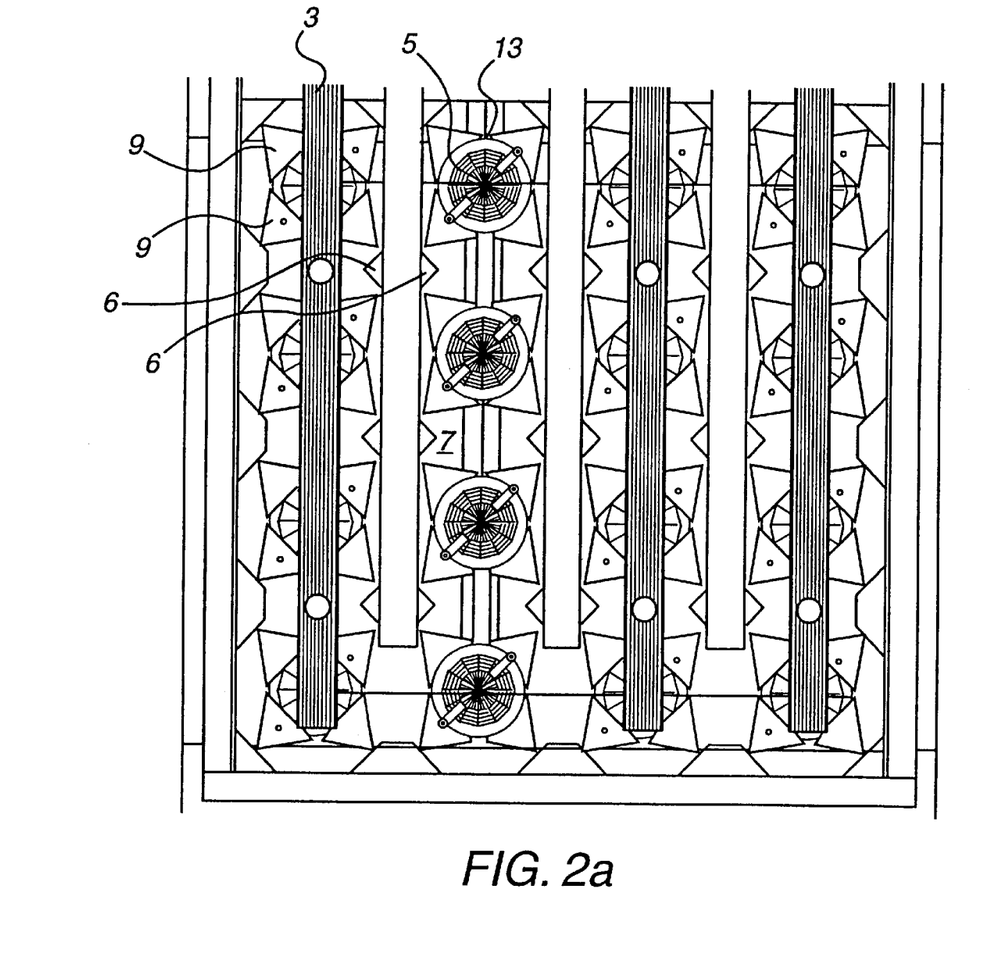
FIG. 2a is a cross-sectional view of the delta-wing design of the present invention.
Figure 2B:
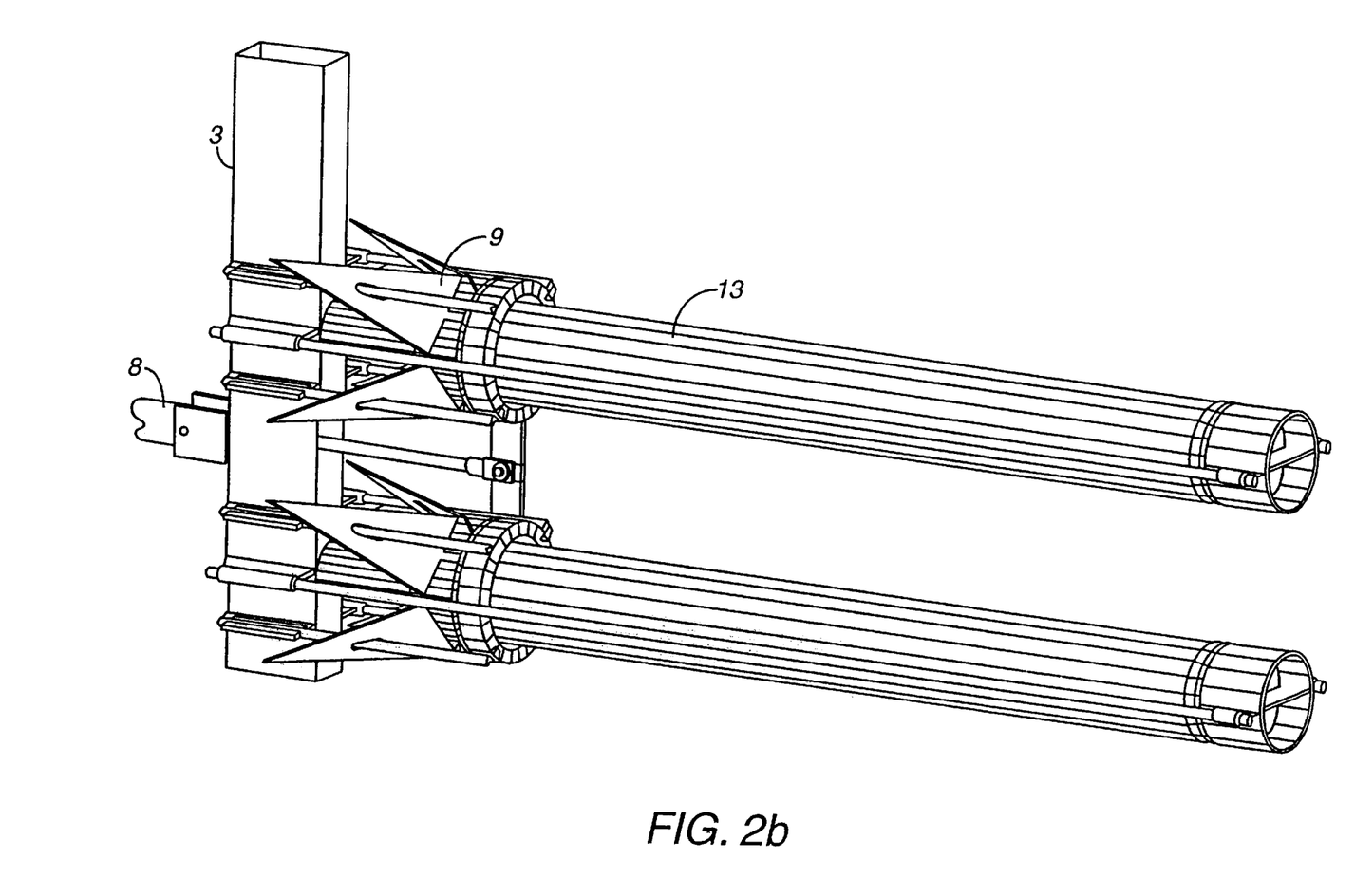
FIG. 2b is a perspective view of the delta-wing design of the present invention.
Figure 3:
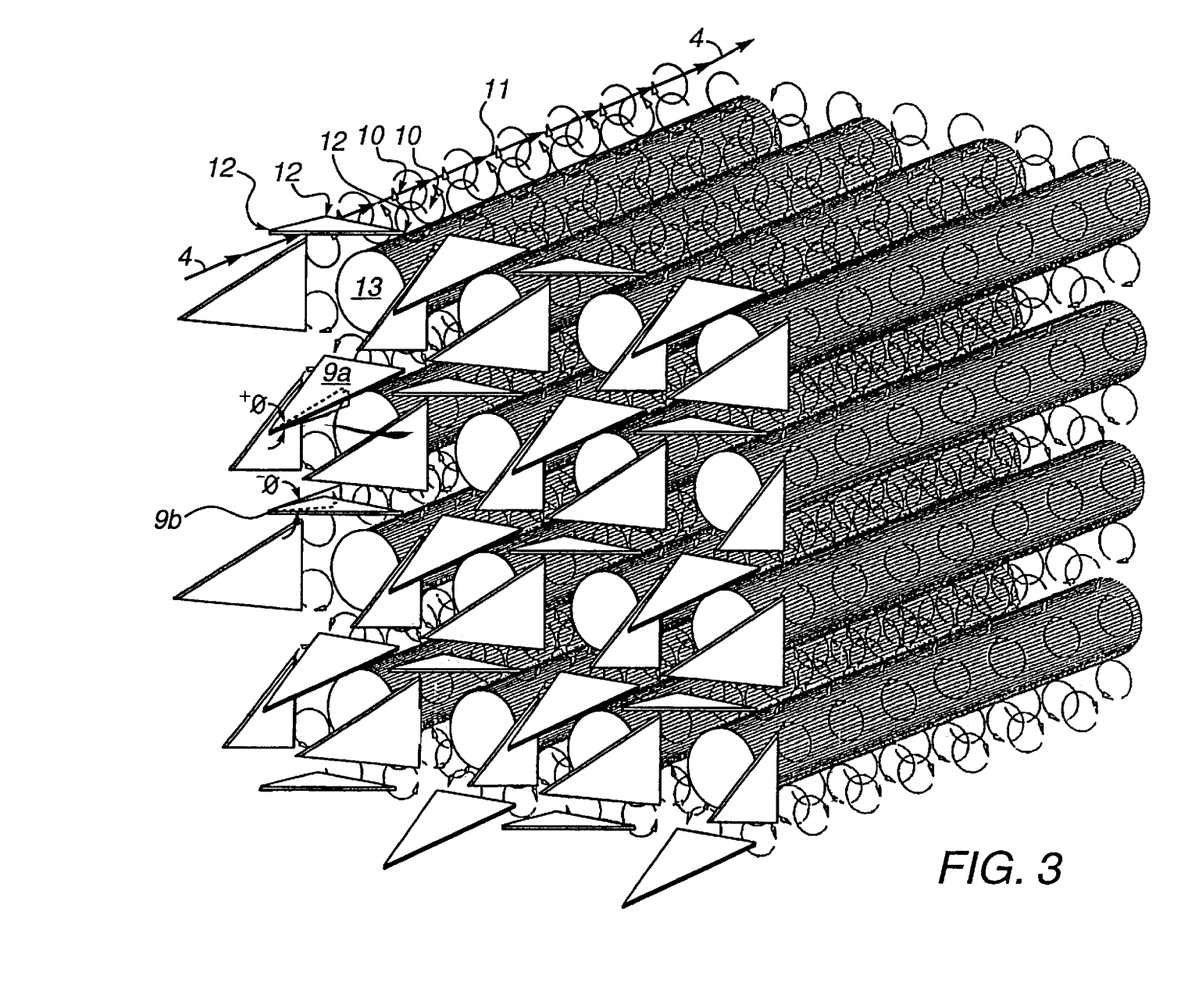
FIGS. 3–5 are cross-sectional views of various square flow arrays which can be used with the present invention.

As shown in FIGS. 2A–2B, in the preferred embodiment each tube 13 is provided with triangular shaped delta wings 9 mounted in pairs upstream of a lamp 5 at the fluid flow entrance into the tube 13 and spacer 6 array. Each delta wing 9 is designed to generate a pair of co-rotating or counter-rotating fluid vortices 10 from its trailing edge 12 as shown in FIG. 3. The center line 11 of each vortex 10 is located about 25% of the wing width from each trailing tip, and has a vertical position controlled by the angle of inclination of the delta wing 9 into the flow (the "attack angle"). Essentially all of the energy dissipated by the fluid passing over the delta wing 9 goes into the large scale trailing vortices 10. As shown in FIG. 3 a pair of delta wings 9a and 9b arranged together with attack angles of opposite inclination (i.e. one with attack angle +θ°, the other with attack angle −θ°) yields four counter-rotating fluid vortices 10 with the characteristics just described. By arranging many pairs of delta wings in an orderly array as shown in FIG. 3, one can produce an effect similar to an array of stationary mixing propellers mounted upstream of the tube and spacer array, whereby selection of a proper propeller blade pitch and profile will result in minimization of small scale turbulence. Although an arrayed scheme such as that shown in FIGS. 3–6 is preferred, the essential characteristic of induced-vortex flow is that the structure used to generate the vortices be shaped and oriented so as to substantially align the axes of the vortices along the direction of the fluid flow 4. As such, a non-arrayed vortex flow system can also be produced using delta-wings 9, and both arrayed and non-arrayed systems can be produced by means other than delta wings 9, including the use of moving or stationary structures placed in the flow path such as specially shaped baffles, propellers and contoured flow tubes, among others. Additionally, co-rotating vortices 14 or co-rotating 14 and counter-rotating 10 vortices can be produced by all of these mechanisms as shown in the triangular array of FIG. 6.

Figure 4:
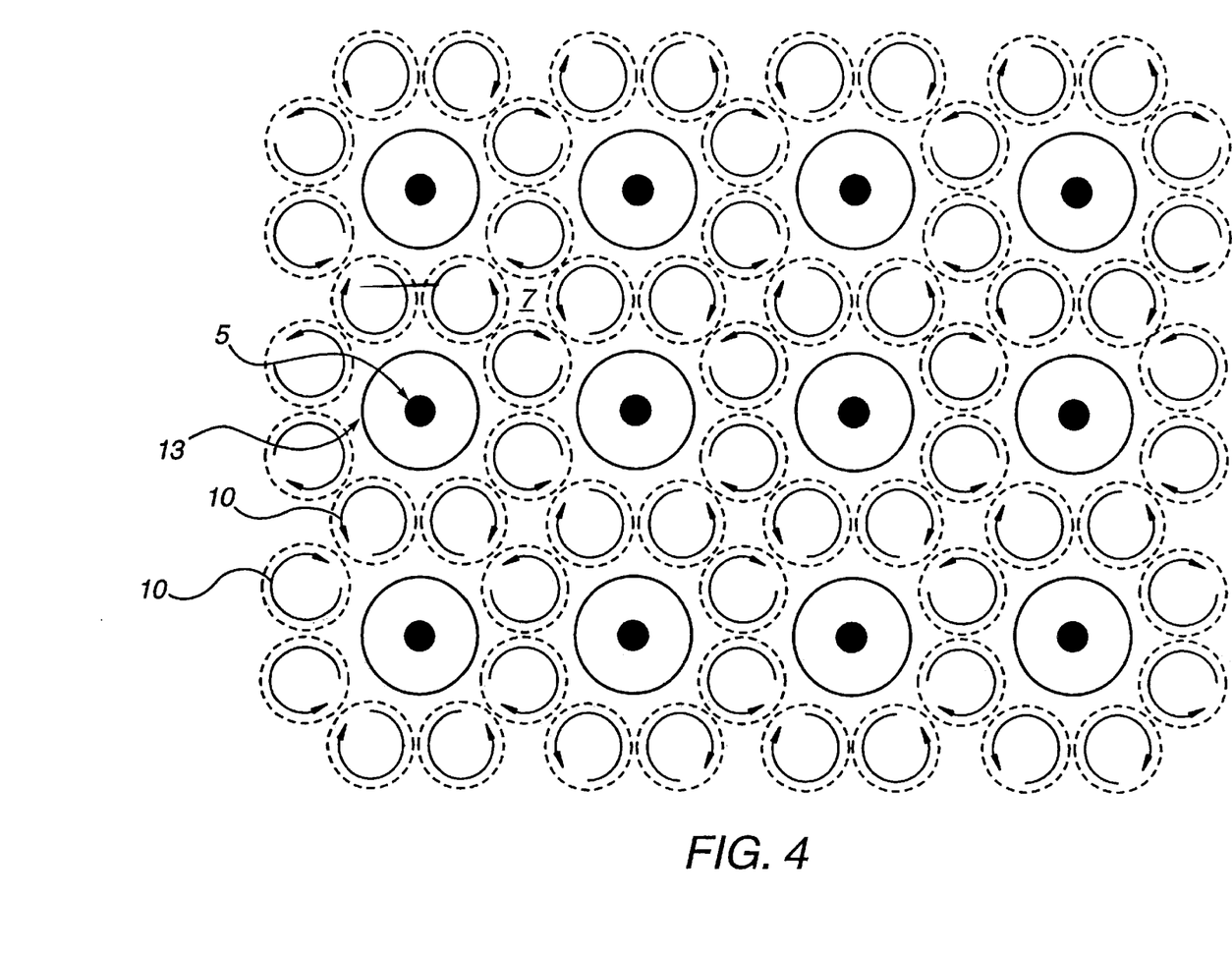
Figure 5:
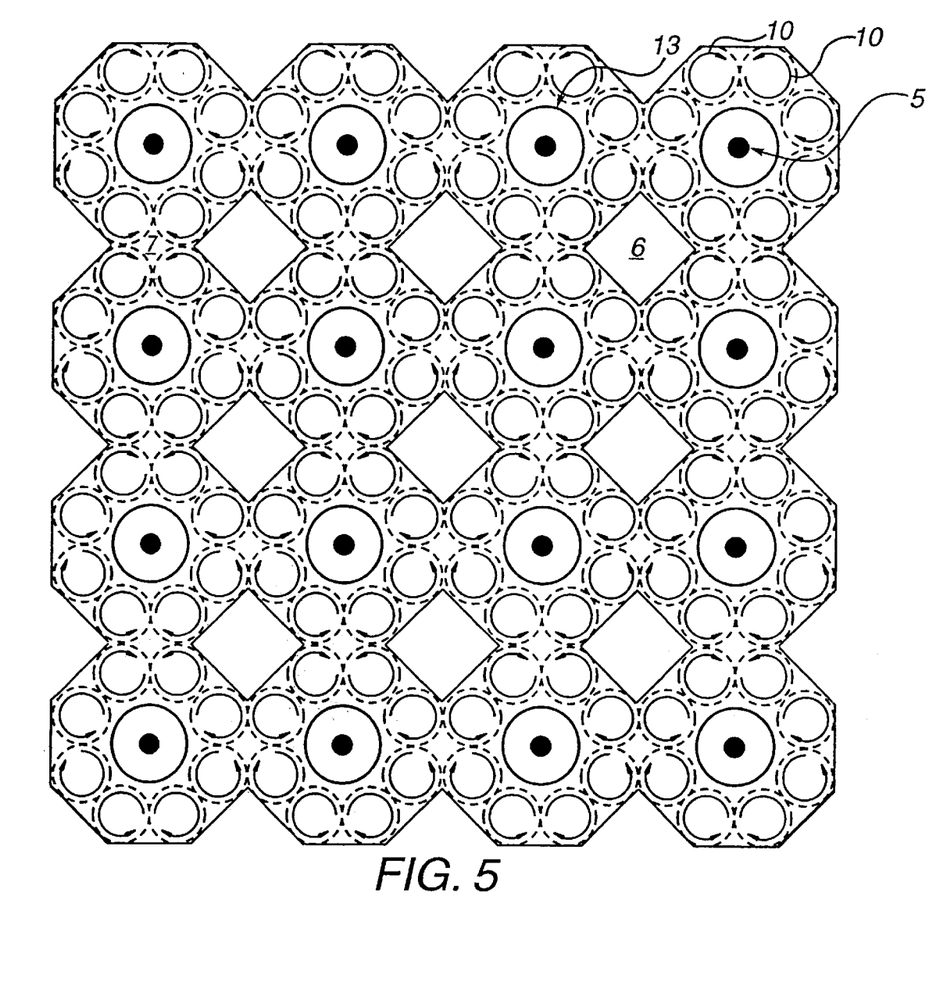
Figure 6:
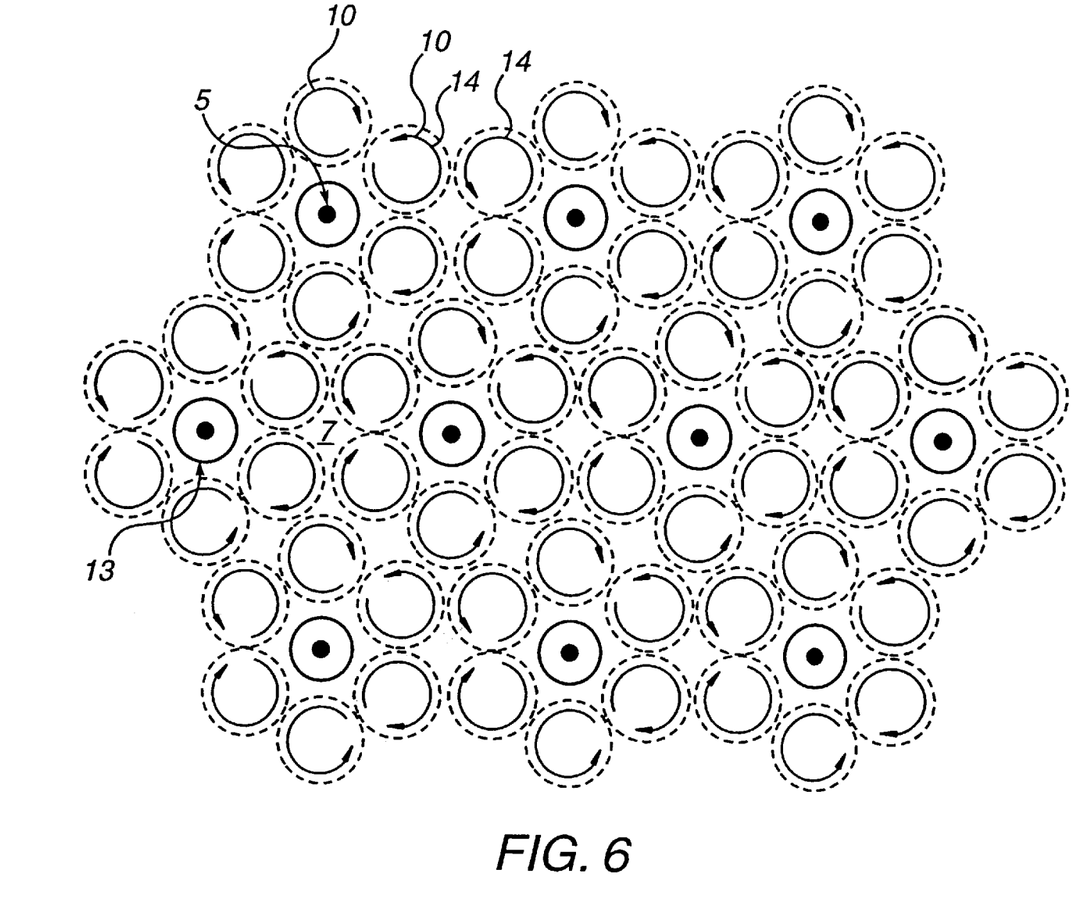
FIG. 6 is a cross-sectional view of an alternate triangular array.

The mixing properties of the counter-rotating vortices 10 produced by the delta-wings 9 are further enhanced by the use of square-pitch tube 13 and spacer 6 arrays as shown in FIGS. 3–5. As shown in FIG. 3, a square-pitch array causes the vortices 10 created by the delta wings 9 to rotate alternately co- and counter-clockwise. This counter-rotation mechanism causes the vortices 10 to reinforce each other which minimizes dissipation of their mixing strength as they move down the channel 7. Due to these co-reinforcing properties large scale vortices 10 produced by square arrays persist for a longer period of time over a greater length of the channel 8 thus requiring less energy to generate a given amount of mixing.

Figure 7:
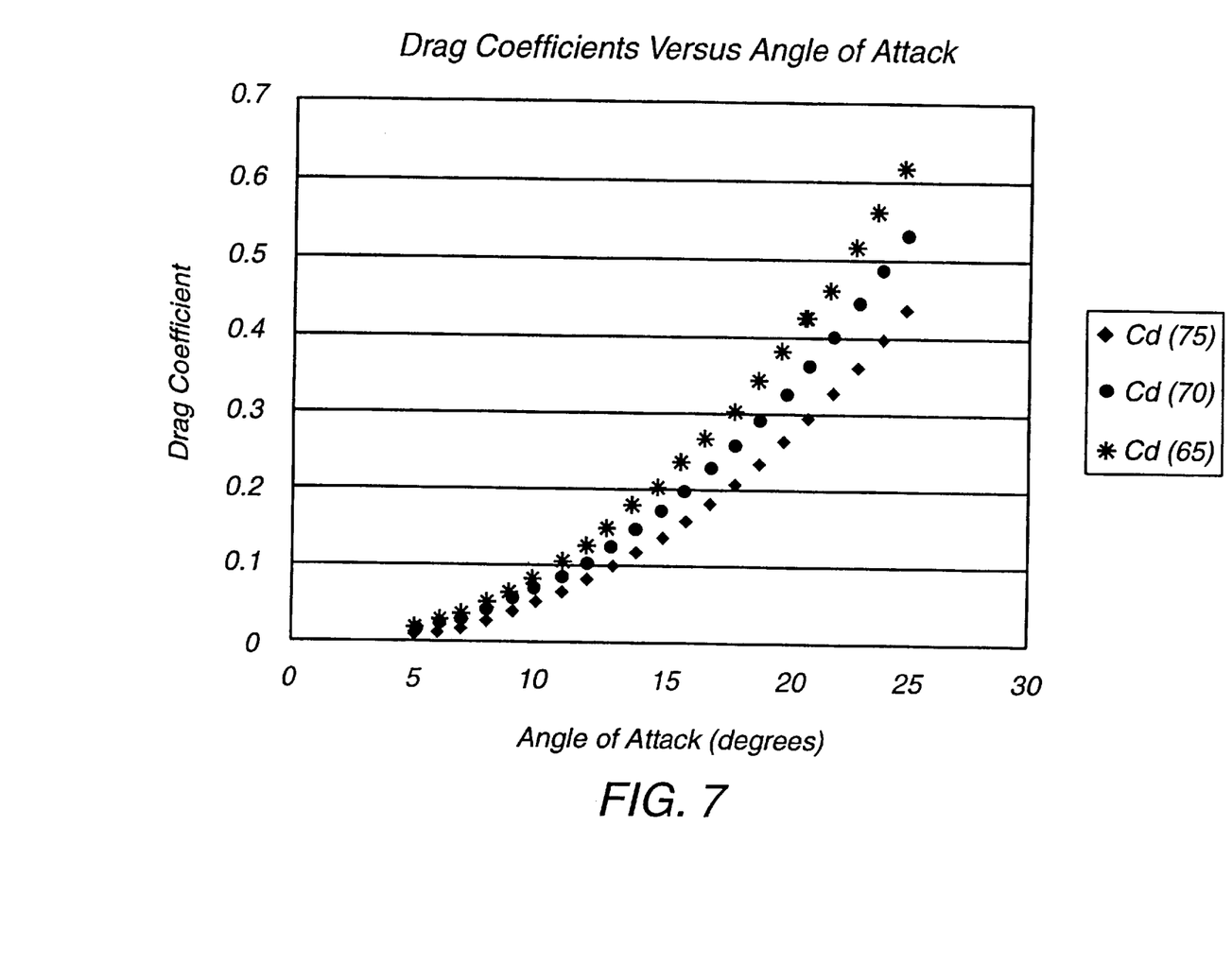
FIG. 7 shows the effect of the delta wing attack angle on the delta wing drag coefficient.
Figure 8A:
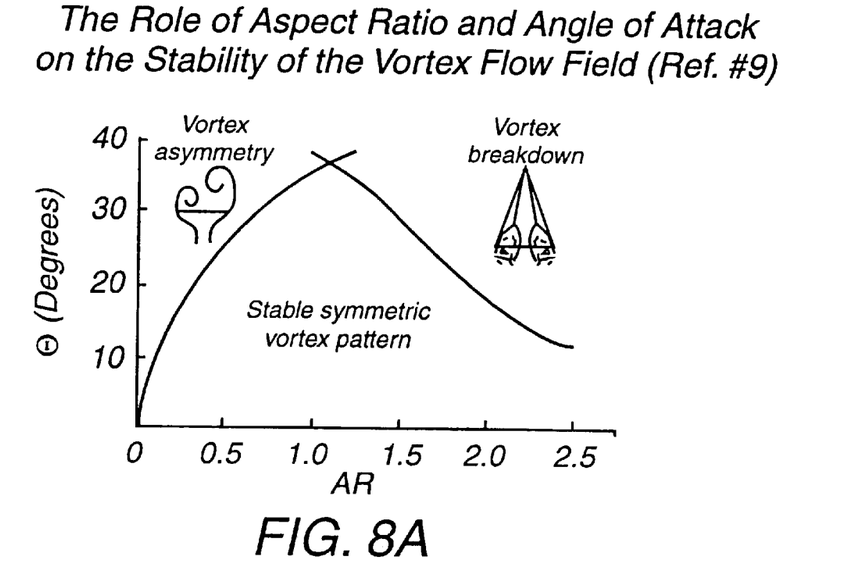
FIGS. 8a and 8b show the relationship of delta wing aspect ratio and angle of attack on the stability of the vortices produced by the delta wings.
Figure 9:
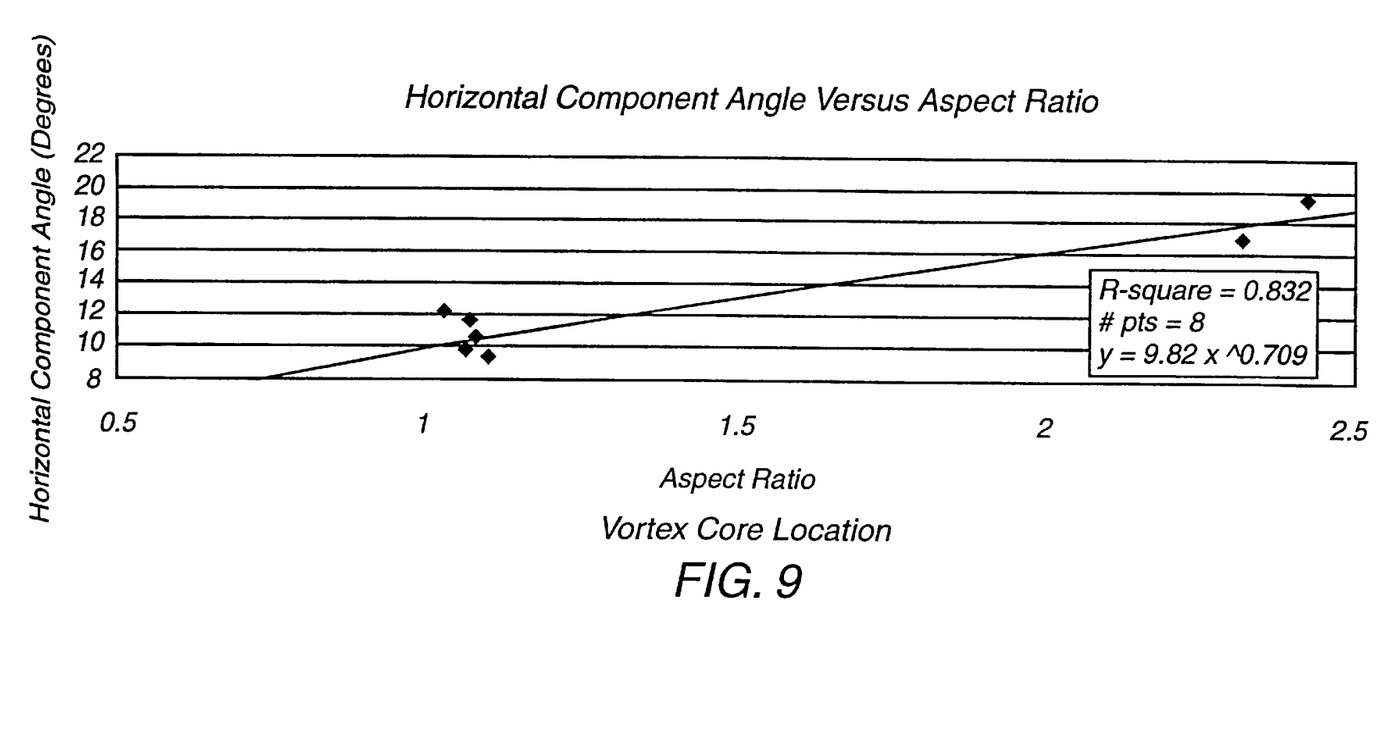
FIG. 9 shows the relationship of the horizontal location of the vortex center line to the delta wing aspect ratio.
Figure 10:
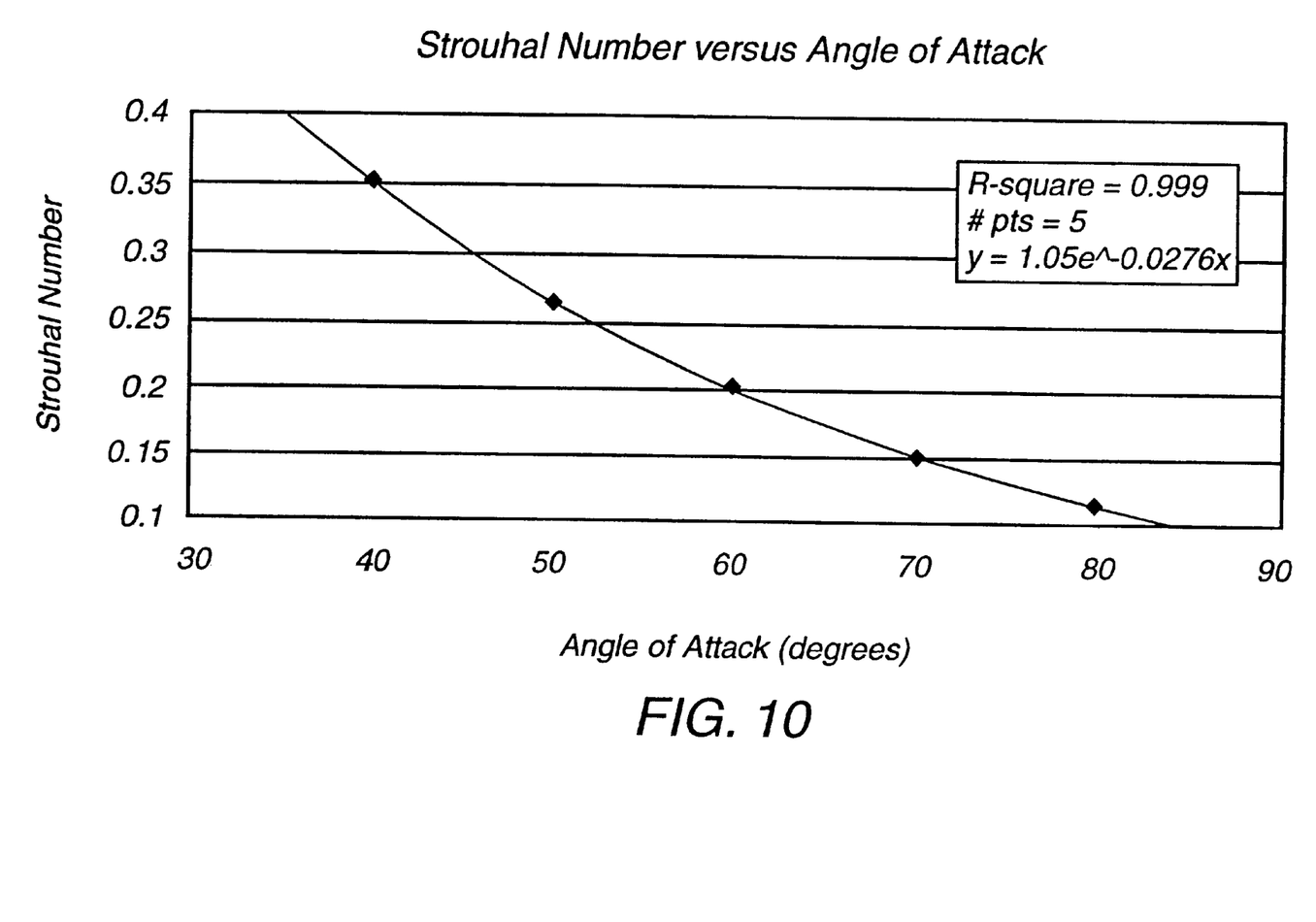
FIG. 10 shows the relationship of the Strouhal number to the delta wing angle of attack.

The delta wings 10 of the present invention were tested in a wind tunnel to confirm their fluid flow characteristics. FIG. 7 shows the effect of the attack angle θ on the delta wing 9 drag coefficient which determines the amount of pressure drop experienced across the wing for a given fluid flow 4.[1] FIG. 8a shows the relationship of aspect ratio AR and angle of attack θ on the stability of the vortices 10 produced by the delta wings 9.[2] FIG. 9 shows the relationship of the horizontal location of the vortex center line 11 to the aspect ratio $AR^3$, while the vertical location of the vortex center line 11 should remain equal to half the angle of attack θ for all aspect ratios AR. The relationship of vortex shedding frequency f (number of vortex revolutions obtained per unit time) to angle of attack θ and fluid flow velocity U is shown in the relationship of the Strouhal number $St^4$ to the angle of attack θ, as shown in FIG. 10. As the fluid flow velocity U decreases so does the vortex shedding frequency f. However, this is counteracted by an increase in the residence time of the fluid in the channel 7, which can result in the same number of vortex revolutions per effective lamp length VR, which as a result causes less degradation in mixing strength with lower flow velocity U than in conventional designs.[5]

[1] The Lift ($C_L$) and Drag ($C_D$) coefficients for delta wings of any aspect ratio were calculated using:

$$C_L = K_P * \sin \theta (\cos \theta)^2 + K_V * (\sin \theta)^2 * \cos \theta \quad (1)$$

$$C_D = C_L * \tan \theta \quad (2)$$

θ=angle of attack (degrees)
$K_p$, $K_v$=obtained from Bertin and Smith (ref. 1)

Figure 8B:
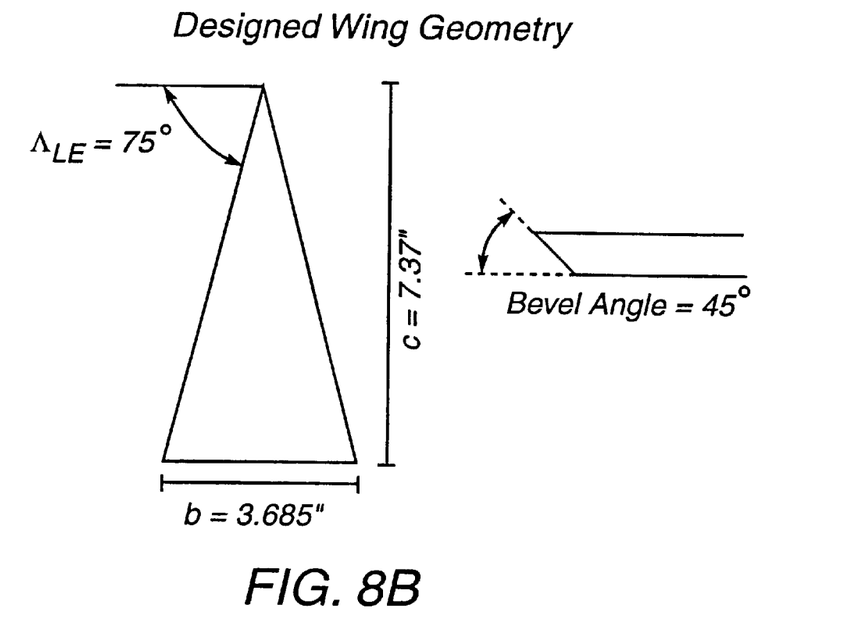

[2] The aspect ratio AR was calculated using the following equation with the dimensions shown in FIG. 8b:

$$AR = 2*b/c \quad (3)$$

b=span (inches)
c=root chord (inches)

[3] The horizontal position of the centerline was calculated using the following equation:

$$HC = 9.82 * AR^{0.709} \quad (4)$$

HC=angle from wing centerline to vortex core (degrees), and
$\theta_{vc} = a/2$.

[4] The Strouhal number St defines the relationship between the shedding frequency to delta wing span and fluid flow velocity in the following equation:

$$St = f*b/U \quad (7)$$

f=shedding frequency (HZ)
b=delta wing span (m)
U=free stream velocity (m/s)

[5] The relationship between the number of vortex revolutions per effective lamp length VR and channel residence time T can be expressed in the following equations:

$$VR = T*f \quad (8)$$

T=channel residence time (s)
f=vortex shedding frequency (Hz)
VR=number of vortex revolutions per effective lamp length $$T = \text{eff. lamp length}/U \quad (9)$$

eff. lamp length=length of lamp (m)
U=fluid flow velocity

The predicted pressure drop across the delta wing 9 was calculated using the following equation:

$$D_p = C_D * r * U^2 * A_{wing}/(2 * A_{flow}) \quad (10)$$

$C_D$=drag coefficient (equation (1))
r=fluid density (kg/m³)
U=fluid velocity (m/s)
$A_{wing}$=area of wing (m²)
$A_{flow}$=area of flow chamber (m²)
$D_p$=pressure drop (Pa)

Figure 11:
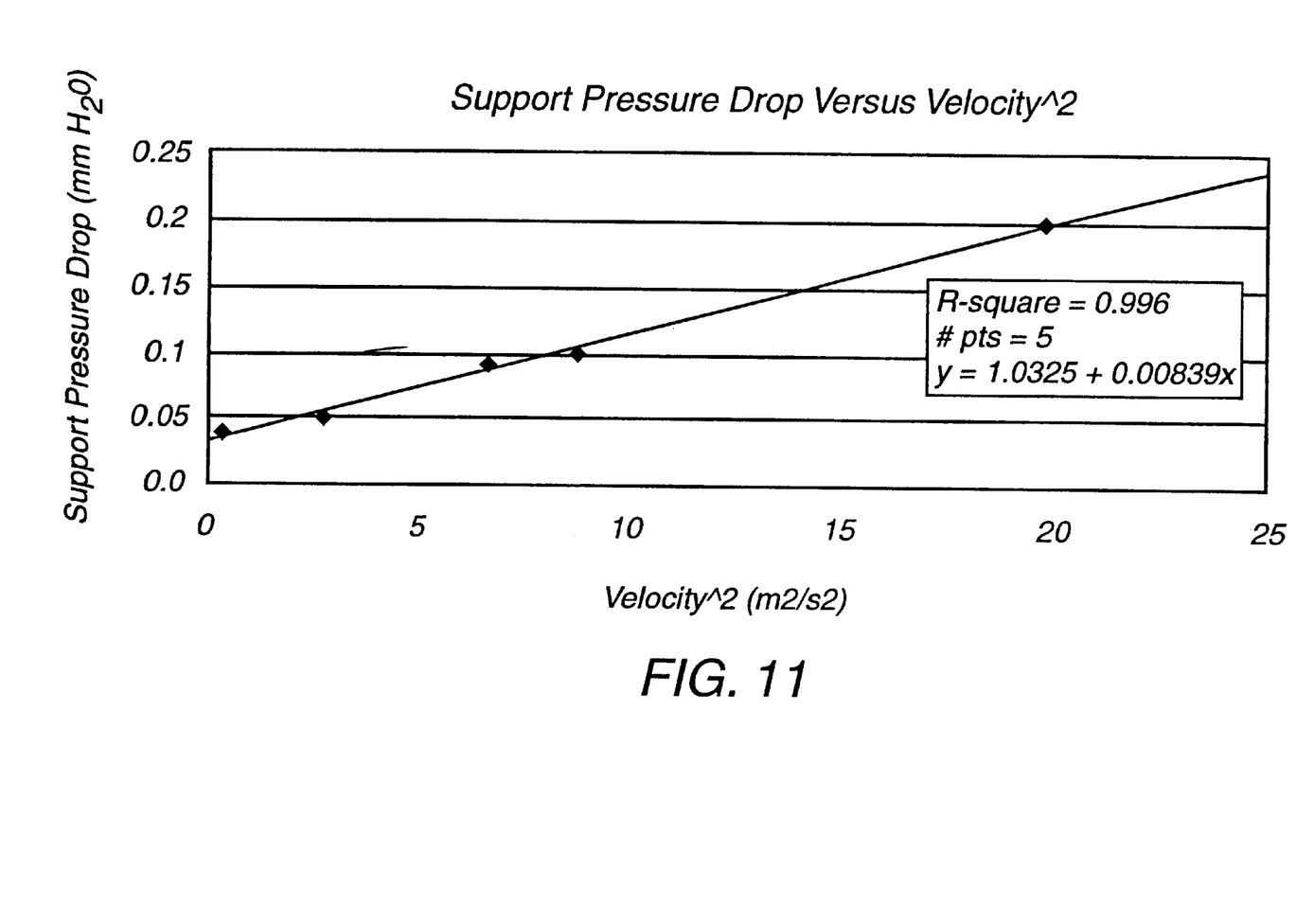
FIG. 11 shows the relationship of experimental pressure drop across the delta wing as a function of flow velocity.
Figure 12A:
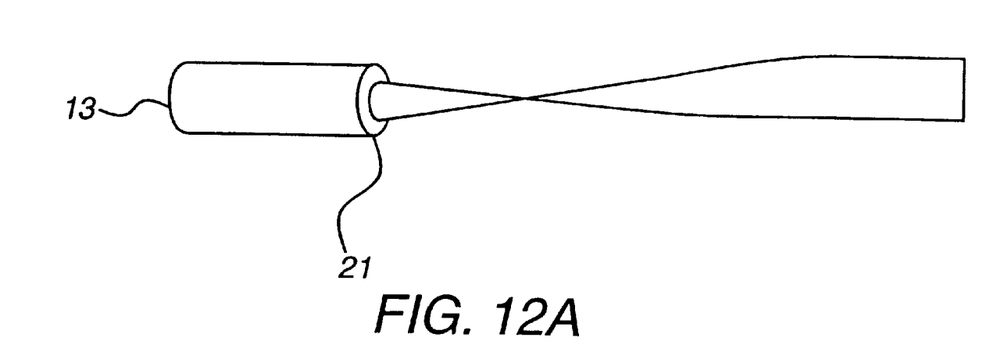
FIGS. 12a and 12b show alternate embodiments of the mixing apparatus of the present invention.
Figure 12B:
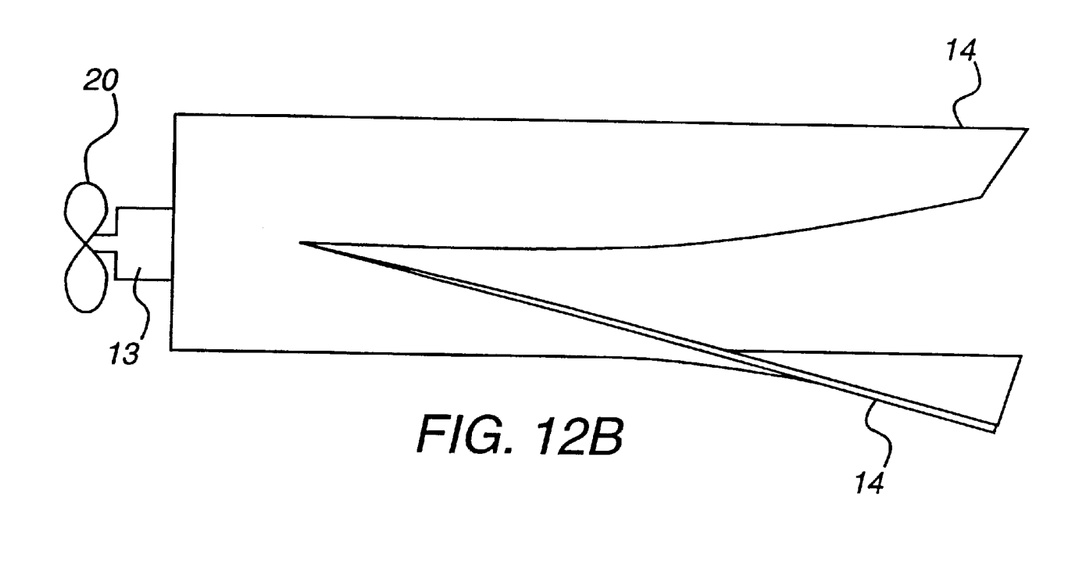

Table 1 and FIG. 11 show the results of a test conducted on a delta wing 9 of the present invention having an aspect ratio AR of unity at various angles of attack θ below forty degrees under a range of fluid flow velocities U. Comparison of the actual test results to predicted results shows that the theoretical model accurately predicts the performance of the delta wing in the desired operating regions. Table 2 shows that the pressure drop generated by the presence of two delta wings 9 in the flow channel 7 is not equivalent to twice the theoretical pressure drop of one wing alone. The increase in pressure drop from the expected value is most likely due to the interaction of the vortices 10 from the two delta wings 9. As a result, the overall pressure drop for a system containing four delta wings 9 is expected to be approximately five times the pressure drop expected for a single wing alone. Table 3 shows the results of testing conducted on a delta wing at high (at least 40°) angles of attack θ.

As a result of the testing, the optimum delta wing 9 design for the preferred embodiment of the present invention conforms to the following specification, with a system of four delta wings 9 per lamp tube 13 or spacer 6 creating a total of eight vortices 10:

Root chord c=7.37 inches
Span b=3.685 inches
Leading edge bevel angle=45 degrees (FIG. 8b)
Angle of attack θ=20 degrees While presently preferred embodiments of practicing the invention have been shown and described with particularity in connection with the accompanying drawings, the invention may otherwise be embodied within the scope of the following claims.

What is claimed is:

1. A method for mixing a fluid flowing through a fluid radiation treatment system having at least one elongate radiation source, said method comprising the steps of:
    submersing a first member in said fluid flow such that a longitudinal axis of said first member being substantially aligned with the direction of said fluid flow, said first member comprising the at least one elongate radiation source;
    coupling a second member to the first member, the second member having a shaped vortex-generating surface located in spaced relationship to said first member;
    orienting said vortex-generating surface to interact with said fluid flow to create at least one vortex in the fluid;
    causing the at least one vortex to rotate about an axis substantially aligned along the direction of said fluid flow; and
    sustaining the at least one vortex downstream of the second member.

2. The method of claim 1, wherein said shaped surface of said second member is triangularly shaped.

3. The method of claim 1, wherein said shaped surface of said second member is inclined at an angle to the direction of said fluid flow.

4. The method of claim 1, wherein at least two vortices are created such that each said vortex rotates in the same direction.

5. The method of claim 1, wherein at least two vortices are created such that said vortices rotate in an opposed direction to each other.

6. The method of claim 1, wherein said fluid system causes a chemical reaction within said fluid.

7. The method of claim 1, wherein said fluid system accomplishes disinfection of said fluid.

8. The method of claim 7, wherein said fluid system accomplishes said disinfection by use of ultraviolet radiation.

9. The method of claim 8, wherein said first members comprise lamps which generate said ultraviolet radiation.

10. The method of claim 9, where said lamps are made of a material comprising quartz.

11. A method for mixing at least one fluid flowing through a fluid radiation treatment system having an array of elongate radiation sources, said method comprising the steps of:
- submersing an array of spaced apart first members in said fluid flow such that a longitudinal axis of each said first member is substantially aligned with the direction of said fluid flow, each said first member comprising one of the elongate radiation sources;
- disposing a plurality of second members in the fluid flow such that each second member corresponds to one of the first members, each second member having a shaped vortex-generating surface located in spaced relationship to said corresponding first member;
- orienting the shaped vortex-generating surfaces to interact with said fluid flow to create a plurality of vortices in the fluid;
- causing each vortex to rotate about an axis substantially aligned along the direction of said fluid flow; and
- sustaining each vortex downstream of the second member.

12. The method of claim 11, wherein at least two vortices are created such that each said vortex rotates in the same direction.

13. The method of claim 11, wherein at least two vortices are created such that said vortices rotate in an opposed direction to each other.

14. The method of claim 11, wherein said shaped surface of said second member is triangularly shaped.

15. The method of claim 11, wherein said shaped surface of said second member is inclined at an angle to the direction of said fluid flow.

16. The method of claim 15, wherein said second members are arranged in pairs such that said angle of said shaped surface for each member in said pair is of substantially equal magnitude and of substantially opposite inclination.

17. The method of claim 11, wherein at least one pair of vortices is created such that said vortices in said pair rotate in an opposed direction to each other.

18. The method of claim 11, wherein at least two pairs of vortices are created such that each said vortex in one said pair rotates in the same direction and such that said vortices in said other pair rotate in an opposed direction to each other.

19. The method of claim 11, wherein said array is uniform.

20. The method of claim 11, wherein said array is not uniform.

21. The method of claim 11, further comprising an array of spaced apart third members interspersed between said first members and each having a surface elongated in a dimension such that the axis of said elongated surface is substantially aligned with the direction of said fluid flow.

22. The method of claim 21, wherein said axes of said third members are arranged substantially in the form of a square.

23. The method of claim 22, wherein said shaped surface of said second member is inclined at an angle to the direction of said fluid flow.

24. The method of claim 23, wherein said center axis is positioned from said third member a distance of approximately one-half the magnitude of said angle of inclination.

25. The method of claim 23, wherein the position of the center axis of a vortex relative to said third member is dimensionally dependent on the magnitude of said angle of inclination of said shaped surface and the spacing of said first member from said third member.

26. The method of claim 23, wherein the position of the center axis of a vortex is dimensionally dependent on the magnitude of said angle of inclination of said shaped surface.

27. The method of claim 21, wherein said third members are configured to permit removal of said members from said system.

28. The method of claim 11, wherein said axes of said first members are arranged substantially in the form of a square.

29. The method of claim 11, wherein said fluid system causes a chemical reaction within said fluid.

30. The method of claim 11, wherein said fluid system accomplishes disinfection of said fluid.

31. The method of claim 30, wherein said fluid system accomplishes said disinfection by use of ultraviolet radiation.

32. The method of claim 31, wherein said first members comprise lamps which generate said ultraviolet radiation.

33. The method of claim 32, where said lamps are made of a material comprising quartz.

34. The method of claim 11, wherein said array sits in a region of continuous flow.

35. The method of claim 1 or 14, further comprising two said second members in spaced relationship to each said first member.

36. The method of claim 1 or 11, further comprising four said second members in spaced relationship to each said first member.

37. The method of claim 1 or 11, wherein the spacing of the center axis of a vortex from a tip of said shaped surface of said second member is dimensionally dependent on the width of one side of said shaped surface.

38. The method of claim 37, wherein said center axis is spaced from a tip of said shaped surface a distance of approximately one quarter of the width of said side of said shaped surface.

39. The method of claim 1 or 11, wherein said first members are configured to permit removal of said first members from said system.

40. The method of claim 1 or 11 wherein the apparatus further comprises a support for suspending at least one said first member in said fluid treatment system, said support comprising:
  (a) a first section to which at least one said first member is attached;
  (b) a second section to which said first section is attached;
  (c) a third section which attaches said second section to a structure located external to said fluid treatment system and configured for anchoring said support;
  wherein said third section rotates to permit installation and removal of said first members within said fluid treatment system.

41. The method of claim 1 or 11, wherein said second member is selected from the group consisting of baffles, propellers and contoured flow tubes.

42. The method of claim 1 or 11, wherein said spaced relationship is such that said second member is located upstream of said first member.

43. The method of claim 1 or 11, wherein said spaced relationship is such that said second member is located adjacent to said elongated surface of said first member.

44. The method of claim 11 wherein said axes of at least three said first members are arranged substantially in the form of a triangle.

45. The method of claim 44, further comprising an array of spaced apart third members interspersed between said first members and each having a surface elongated in a dimension such that the axis of said elongated surface is substantially aligned with the direction of said fluid flow.

46. The method of claim 45, wherein said second members are arranged so as to create an even number of vortices adjacent to each said first member.

47. The method of claim 46, wherein all said vortices rotates in the same direction.

48. The method of claim 1 or 11, wherein said shape and orientation of at least one said second member is such that at least one said vortex shall be sustained substantially throughout the entire duration of said fluid flow.

49. The method of claim 1 or 11, wherein each said second member is mounted to one of said first members.

50. The method of claim 49 wherein the apparatus further comprises a support for suspending at least one said first member in said fluid treatment system, said support comprising:
(a) a first section to which at least one said first member is attached;
(b) a second section to which said first section is attached;
(c) a third section which attaches said second section to a structure located external to said fluid treatment system and configured for anchoring said support;
wherein said third section rotates to permit installation and removal of said first members within said fluid treatment system.

51. The method of claim 3 or 15, wherein the position of the center axis of a vortex is dimensionally dependent on the magnitude of said angle of inclination of said shaped surface.

52. The method of claim 51, wherein said center axis is positioned from said first member a distance of approximately one-half the magnitude of said angle of inclination.

53. The method of claim 51, wherein the position of the center axis of a vortex relative to said first member is dimensionally dependent on the magnitude of said angle of inclination of said shaped surface and the spacing of said first member from said second member.

54. The method of claim 11 or 28, wherein said second members are arranged so as to create eight vortices adjacent to each said first member such that each said vortex is adjacent to at least one other said first member.

55. The method of claim 54, wherein each said vortex rotates in an opposed direction to at least one other said vortex.

56. The method of claim 54, wherein all said vortices rotate in the same direction.

57. The method of claim 54 wherein at least one said vortex rotates in an opposed direction to all other said vortices.

58. The method of claim 54 wherein each said vortex rotates in an opposed direction to all other adjacent vortices.

59. The method of claim 21 or 22, wherein said second members are arranged so as to create eight vortices adjacent to each said first member such that each said vortex is adjacent to at least one other said first member and to at least one said third member.

60. The method of claim 59, wherein each said vortex rotates in an opposed direction to at least one other said vortex.

61. The method of claim 59, wherein all said vortices rotate in the same direction.

62. The method of claim 59 wherein at least one said vortex rotates in an opposed direction to all other said vortices.

63. The method of claim 59 wherein each said vortex rotates in an opposed direction to all other adjacent vortices.

64. The method of claim 11 or 44, wherein said second members are arranged so as to create six vortices adjacent to each said first member.

65. The method of claim 64, wherein each said vortex rotates in an opposed direction to at least one other said vortex.

66. The method of claim 64, wherein all said vortices rotates in the same direction.

67. The method of claim 64 wherein at least one said vortex rotates in an opposed direction to all other said vortices.

68. The apparatus of claim 64 wherein each said vortex rotates in an opposed direction to all other adjacent vortices.

69. The method of claim 1, 11, 28, 22, 44, 45, or 46, wherein at least one said vortex rotates in an opposed direction to all other said vortices.

70. The method of claim 1, 11, 44, 45 or 46, wherein each said vortex rotates in an opposed direction to at least one other said vortex.

71. The apparatus of claim 1, 11, 44, 45 or 46, wherein each said vortex rotates in an opposed direction to all other adjacent vortices.

72. A UV water-treatment, fluid-mixing process, comprising the steps of:
disposing a UV lamp device in water, substantially parallel to a direction of water flow;
coupling at least first and second mixers at an upstream portion of the UV lamp device;
causing water to flow over the first and second mixers to cause respective first and second fluid vortices to rotate about respective spaced-apart first and second axes each of which is (i) substantially parallel to a longitudinal axis of the UV lamp device and (ii) outside of an outer surface of the UV lamp device; and
causing the first and second vortices to reinforce each other's rotations to sustain the first and second vortices in a direction toward a downstream end of the UV lamp device.

* * * * *